United States Patent [19]

Morita et al.

[11] 4,434,778
[45] Mar. 6, 1984

[54] AIR INDUCTION CONTROL DEVICE FOR INTERNAL COMBUSTION ENGINE

[75] Inventors: Hideo Morita, Yokohama; Yoshio Iwasa, Nagareyama, both of Japan

[73] Assignee: Nissan Motor Co., Ltd., Yokohama, Japan

[21] Appl. No.: 457,560

[22] Filed: Jan. 13, 1983

Related U.S. Application Data

[63] Continuation of Ser. No. 126,099, Feb. 29, 1980.

[30] Foreign Application Priority Data

Mar. 6, 1979 [JP] Japan ................................ 54-25763
May 8, 1979 [JP] Japan ................................ 54-61528

[51] Int. Cl.³ ............................................ F02M 7/12
[52] U.S. Cl. .................................. 123/587; 123/327; 123/585
[58] Field of Search ............... 123/327, 587, 585; 251/75, 77, 61.4, 83, 82, 61.3

[56] References Cited

U.S. PATENT DOCUMENTS

| | | | |
|---|---|---|---|
| 1,996,219 | 4/1935 | Thomas | 123/587 |
| 3,287,899 | 11/1966 | Bintz | 123/587 |
| 3,317,181 | 5/1967 | Robbins | 251/75 |
| 3,949,717 | 4/1976 | Rittmannsberger | 123/587 |
| 3,986,353 | 10/1976 | Otsubo | 251/61.4 |
| 4,142,707 | 3/1979 | Bjorklund | 251/77 |
| 4,196,709 | 4/1980 | Toryu | 123/587 |
| 4,220,123 | 9/1980 | Utz | 123/587 |
| 4,257,227 | 3/1981 | Sato | 123/587 |
| 4,276,746 | 7/1981 | Yamanaka | 123/587 |
| 4,285,312 | 8/1981 | Nakazeki | 123/327 |
| 4,289,100 | 9/1981 | Kinugawa | 123/585 |
| 4,297,984 | 11/1981 | Kawabata | 123/327 |
| 4,310,141 | 1/1982 | Tamura | 123/327 |
| 4,325,349 | 4/1982 | Fehrenbach | 123/587 |

FOREIGN PATENT DOCUMENTS

| | | |
|---|---|---|
| 633575 | 12/1949 | United Kingdom . |
| 1359164 | 7/1974 | United Kingdom . |
| 1380595 | 1/1975 | United Kingdom . |
| 1401839 | 9/1975 | United Kingdom . |
| 1507058 | 4/1978 | United Kingdom . |
| 1591649 | 6/1981 | United Kingdom . |

Primary Examiner—Ronald H. Lazarus
Attorney, Agent, or Firm—James Creighton Wray

[57] ABSTRACT

An air induction control device for an internal combustion engine is composed of an air passage for communicating upstream and downstream sides of a throttle valve in an intake passageway when opened, a valve member movably disposed in the air passage to open the air passage in response to pressure differential between the upstream and downstream sides of the throttle valve in the intake passageway, and a diaphragm member mechanically connectable to the valve member so as to open the air passage in response to vacuum prevailing in the intake passageway downstream of the throttle valve, thereby effectively controlling air induction to the engine, even when the throttle valve is closed during normal engine deceleration and at sudden engine deceleration or during operation of engine accessories at idle throttle state.

14 Claims, 8 Drawing Figures

FIG. 6
FIG. 7
FIG. 8
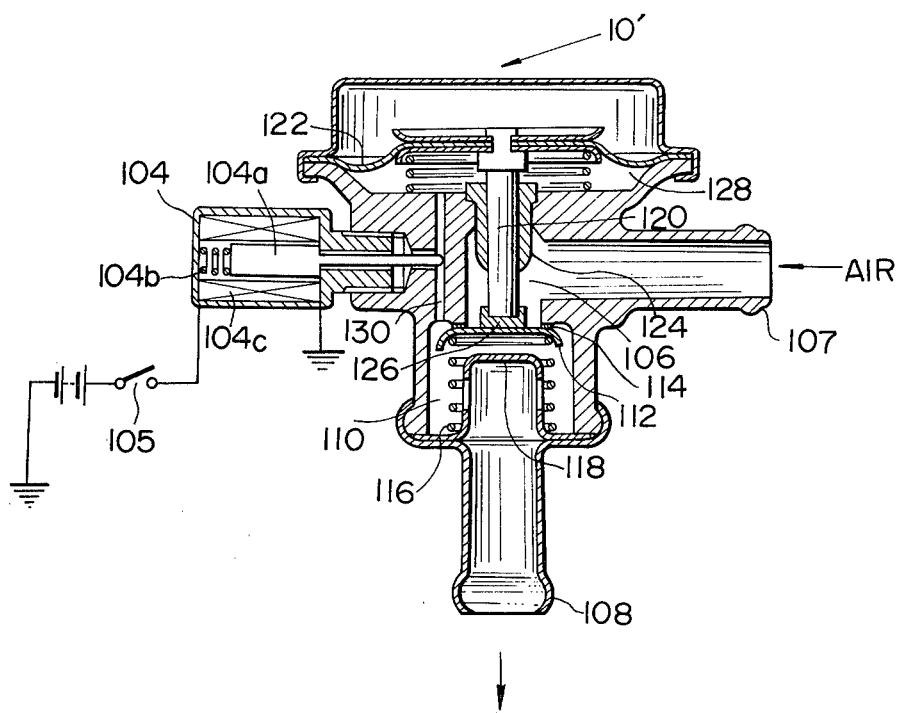
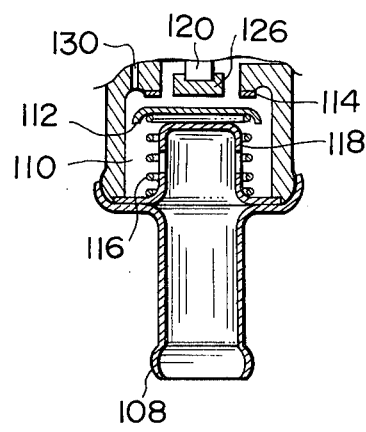
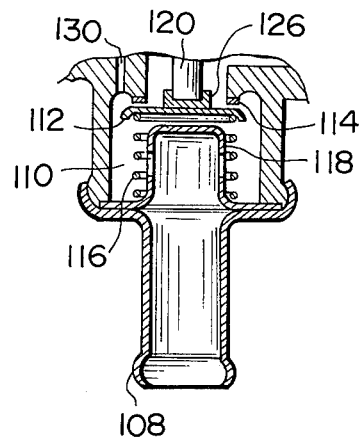

AIR INDUCTION CONTROL DEVICE FOR INTERNAL COMBUSTION ENGINE

This application is a continuation of application Ser. No. 126,099, filed Feb. 29, 1980.

BACKGROUND OF THE INVENTION

This invention relates, in general to an air induction control device for an internal combustion engine, which controls air to be inducted to an intake passage downstream of a closed throttle valve, and more particularly to an air induction device functioning to supply air into the combustion engine both continuously during a normal engine deceleration and temporarily at a sudden engine deceleration or during operation of engine accessories at idle throttle state.

In connection with air induction in an internal combustion engine, when a throttle valve is maintained at its idle position, for example, during a relatively long period engine deceleration, an extremely high vacuum is kept for a long period of time in an intake passageway downstream of the throttle valve. As a result, engine oil may be sucked into a combustion chamber through a clearance between a cylinder surface and a piston, which increases engine oil consumption. As will be apparent, this problem rises at a relatively high vacuum prevailing in the intake passageway downstream of the throttle valve.

Furthermore, when the throttle valve is abruptly closed from its high speed position, for example, during a sudden engine deceleration, the vacuum in the intake passageway downstream of the throttle valve abruptly increases by the pumping action of the piston. As a result, fuel adhered on the surface of the intake passageway may be vaporized in a moment so as to temporarily supply the combustion chamber of the engine with over-rich air-fuel mixture which will give rise to misfire. This over-rich air-fuel mixture causes the engine to produce unburned combustible gas which may result in so-called backfire in which the combustible gas drastically burns with sound in an exhaust conduit. Additionally, in using engine accessories such as an air conditioner and a power steering system air, engine stall may occur during operation of the engine accessories at idling. As such, it is required to increase idle engine speed under such a condition. Such problems at the rapid deceleration and during operation of engine accessories rise at a relatively low vacuum prevailing in the intake passageway downstream of the throttle valve.

In order to solve the above-mentioned two kinds of problems raised at the relatively low and high vacuum prevailing in the intake passageway downstream of the throttle valve, two separate devices are, in conventional techniques, installed at an intake system of the engine by which air is introduced into the engine bypassing the throttle valve when the vacuum prevailing in the intake passageway downstream of the throttle valve exceeds a predetermined level and a predetermined higher level. As such, engine layout becomes complicated, increasing engine weight. Additionally, such devices require complicated pipings using a large number of rubber hoses etc. and accordingly are liable to raise accidents such as hose breakages, hose disconnections, and air leaks from hose connections. This unavoidably needs troublesome service for maintenance.

SUMMARY OF THE INVENTION

According to the present invention, in an air induction control device or valve for an internal combustion engine having an intake passageway in which a throttle valve is rotatably disposed, a valve member is movably disposed in an air passage through which upstream and downstream sides of the throttle valve in the intake passageway are communicable. This valve member opens the air passage to establish communication between the upstream and downstream sides in response to pressure differential between the upstream and downstream sides in the intake passageway. With this valve member, air is supplied to the engine during a relatively long period deceleration. Additionally, the air induction control device is provided with a diaphragm member mechanically connectable with the valve member and movable to move the valve member so as to open the air passage in response to vacuum prevailing in the intake passageway downstream of the throttle valve. By virtue of this diaphragm member, air is supplied to the engine even at a sudden and temporary engine deceleration or during operation of engine accessories such as an air conditioner and a power steering system.

A main object of the present invention is to provide an improved air induction control device for an internal combustion engine, by which engine layout is rendered simple to improve durability, reliability, and maintenability of the engine, thereby improving commercial value of the engine.

Another object of the present invention is to provide an improved air induction control device for an internal combustion engine, by which pipes for piping and brackets for installation are decreased in number as compared with conventional techniques to decrease the weight of the engine, which improves fuel economy.

A further object of the present invention is to provide an improved air induction control device for an internal combustion engine, which is simple in construction and low in cost and functions to control air induction to the engine both during a relatively long period engine deceleration and at a sudden engine deceleration or during operation of engine accessories at idle throttle position.

Other objects, features and advantages of the improved air induction control device according to the present invention will become more apparent from the following description taken in conjunction with the accompanying drawings.

BRIEF DESCRIPTION OF THE DRAWINGS

FIG. 6 is a vertical cross-sectional view of the air induction control device of FIG. 5; and FIGS. 7 and 8 are schematic illustrations showing the manner of operation of the air induction control device of FIG. 6.

DESCRIPTION OF THE PREFERRED EMBODIMENTS

Figure 1:
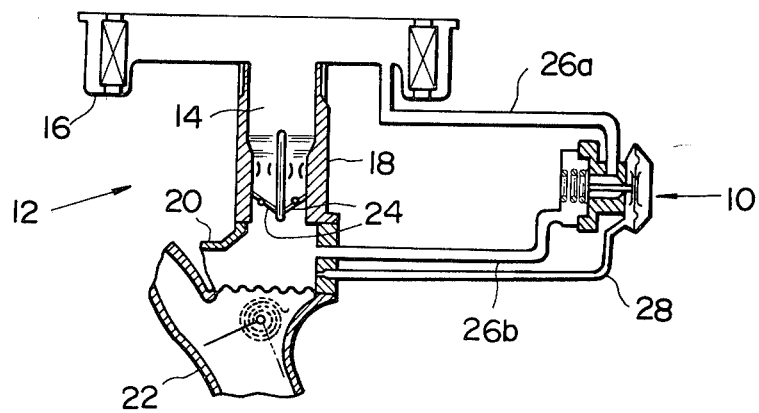
FIG. 1 is a vertical cross-sectional view of a part of an engine provided with a preferred embodiment of an air induction control device in accordance with the present invention.

Referring now to FIG. 1 of the drawing, a preferred embodiment of an air induction control device or valve 10 according to the present invention is shown as incorporated with an air intake system 12 of an internal combustion engine (not shown). The intake system 12 is formed with an air intake passageway 14 which is formed through an air filter 16, a carburetor 18, and an intake conduit 20 which is adjacent to an exhaust pipe 22. The carburetor 18 is provided with two throttle valves 24.

The air induction device 10 is fluidly connected through an upstream side bypass passage 26a to the inside of the air filter 16 and through a downstream side bypass passage 26b to the intake air passageway 14 downstream of the throttle valves 24. Additionally, the air induction device 10 is further fluidly connected through an intake vacuum signal passage 28. The air induction device 10 is formed of a metal or a plastic and so arranged as to establish communication between the upstream and downstream side bypass passages 26a and 26b when vacuum prevailing downstream of the throttle valves 24 rapidly rises or continuously exceeds a predetermined level, by which atmospheric air bypasses over the throttle valves 24 and is supplied into the intake conduit 20 located downstream of the throttle valves 24.

Figure 2:
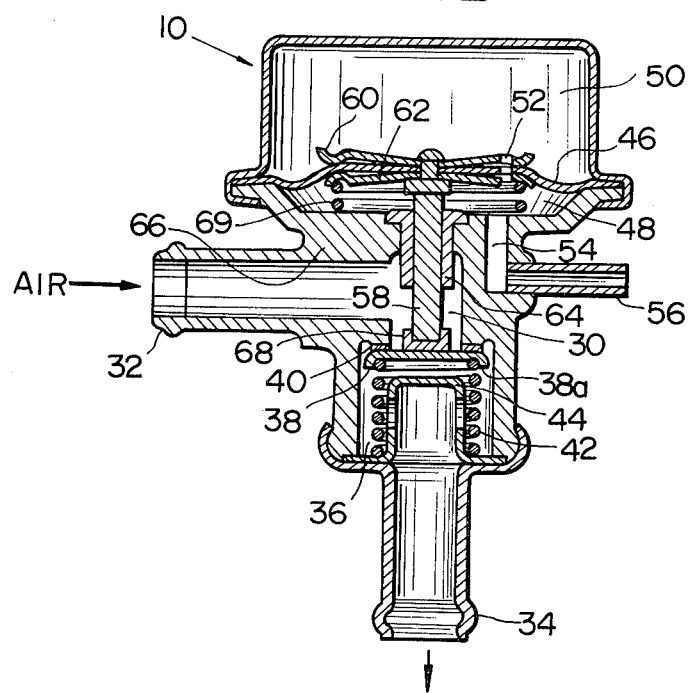
FIG. 2 is a vertical cross-sectional view of the air induction control device of FIG. 1.

As shown in FIG. 2, the air induction control device 10 is formed with an air passage 30 through which an air inlet 32 is communicable with an air outlet 34. The air inlet and outlets 32 and 34 are so located that their axes (not shown) intersect each other at right angles. The air inlet and outlets 32 and 34 are fluidly connected to the upstream and downstream side bypass passages 26a and 26b, respectively. The downstream section of the air passage 30 is enlarged in diameter to form a valve chamber 36 in which a disc and plate type valve member 38 is movably disposed. The valve member 38 is normally biased against a valve seat 40 by means of a spring 42 disposed in the valve chamber 36. The valve seat 40 is secured to the inside wall of the valve chamber 36 and made of, for example, a rubber to prevent the generation of noises due to valve operation. By the action of the spring 42 which is located between the lower surface of the valve member 38 and the bottom inside wall of the valve chamber 36, the valve member 38 always receives a certain force to be biased to the valve seat 40, so that the valve member 38 is normally seated on the valve seat 40 to close the air passage 30 so as to block communication between the upstream and downstream side bypass passages 26a and 26b. However, only when the vacuum prevailing in the intake passageway 14 downstream of the throttle valve 24 exceeds a certain level, the valve member 38 receives a force overcoming the bias of the spring 42 to separate from the valve seat 40 and moves downward in the valve chamber 36 in the drawing so as to open the air passage. At this time, the flow amount of atmospheric air increases in accordance with the descent distance of the valve member 38. The valve member 38 is formed with a bent portion 38a to prevent the lateral movement of the spring 42, improving the operational accuracy of the valve member 38. A stopper 44 for the valve member 10 is formed in the valve chamber 36 downstream of the valve member 38 in order to restrict the descent movement of the valve member 38, and accordingly the amount of the atmospheric air flowing through the valve member 38.

A diaphragm member 46 is provided to define a first vacuum chamber 48 and a second vacuum chamber 50 on the opposite sides of the diaphragm member 46. The first vacuum chamber 48 is in communication with the second vacuum chamber 50 through an orifice 52 which has a small diameter opening. The orifice may be of openings formed through a sintered metal though not shown. The volume of the first vacuum chamber 48 is smaller than the second vacuum chamber 50. A vacuum passage 54 is provided to communicate the first vacuum chamber 48 with a vacuum pipe 56 which connects with the vacuum signal passage 28 so that the vacuum signal from the intake passageway 14 downstream of the throttle valves 24 is supplied directly to the first vacuum chamber 48.

A rod member 58 is secured to the central portion of the diaphragm member 46 through two plate members 60 and 62 and extends of the air passage 30 through a guide sleeve member 64 secured to a wall portion 66 defining the bottom surface of the first vacuum chamber 48. In this case, the rod member 58 extends along the axis of the air outlet 34 and is provided at its free end with a damping member 68 made of a rubber or a plastic. It will be understood that the rod member 58 is moved upward and downward with the movement of the diaphragm member 46 caused by the pressure differential between the first and second vacuum chambers 48 and 50. By the action of a spring 69 disposed between the lower surface of the diaphragm member 46 and the bottom wall of the first vacuum chamber 48, the rod member 58 is kept at its upper-most position when the pressure differential between the first and second vacuum chambers 48 and 50 is zero. It is to be noted that the rod member 58 is so arranged that its free end with the damping member 68 just contacts or is suitably spaced from the surface of the valve member 38 when the rod member 58 is at the upper-most position upon no pressure differential between the first and second vacuum chambers 48 and 50.

Figure 3:
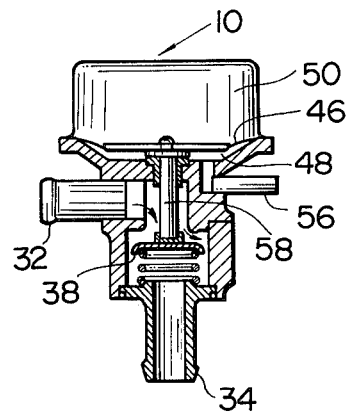
FIGS. 3 and 4 are schematic illustrations showing the manner of operation of the air induction control device of FIG. 2.
Figure 4:
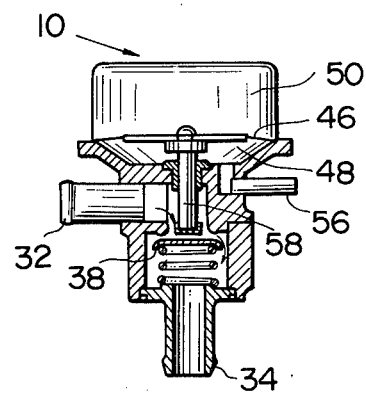

The manner of operation of the air induction control device 10 shown in FIGS. 1 and 2 will be explained also with reference to FIGS. 3 and 4.

At a sudden engine deceleration at which the throttle valve 24 rapidly closes, the vacuum in the intake conduit 20 downstream of the throttle valve 24 rapidly rises by the pumping action of a piston in the engine and accordingly the vacuum in the first vacuum chamber 48 rapidly rises. Now, it is to be noted that a certain time is required until the vacuum degree of the second vacuum chamber 50 becomes equal to that of the first vacuum chamber 48 by the fact that the orifice 52 has a small sectional area and the second vacuum chamber 50 has a considerable volume relative to the volume of the first vacuum chamber 48. Such a time required is proportional to the pressure differential between the first and second vacuum chambers 48 and 50, which pressure differential is generated due to the variation in the vacuum in the intake conduit 20. Thus, the vacuum in the first vacuum chamber 48 is higher or larger than that in the second vacuum chamber 50 during the above-mentioned certain time, and therefore the diaphragm member 46 moves downward as indicated in FIG. 3, by which the rod member 58 is also moved downward with the movement of the diaphragm member 46. As a result, the rod member 58 pushes down through the damping member 68 the valve member 38 to a location which is lower than an initial location of the valve closed position, for example, by 2 to 4 mm in maximum, so that the valve member 38 is rendered open to communicate the upstream and downstream bypass passages 26a and 26b with each other.

Thus, atmospheric air is introduced into the intake air passageway 14 downstream of the throttle valve 24 through the upstream side bypass passage 26a, the air passage 30 formed in the device 10 and the downstream side bypass passage 26b. The introduction of atmospheric air is carried out in a moment in a relatively large amount, for example, 300 to 500 liters per minute in maximum. Accordingly, the vacuum within the intake conduit 20 is prevented from rapid and considerable rise, which prevents a so-called backfire and noxious gas emission caused by the fact that fuel adhered on the surface of the intake conduit 20 is suddenly vaporized to temporarily supply over-rich air-fuel mixture into a combustion chamber (not shown) of the engine, which is due to the rapid rise in the vacuum in the intake conduit 20. Additionally, since the rod member 58 strikes against the surface of the valve member 38 through the damping member 68, noise generation and wear of the free end portion of the rod member 58 can be effectively prevented. Furthermore, since the valve member 38 cannot descend beyond a certain location, an excess amount of atmospheric air cannot be supplied through the valve member 38 into the intake conduit 20 even if the breakage of the spring 42 arises or sticking between the rod member 58 and the guide sleeve 64 occurs. Accordingly, an engine stall or stop due to supply of over-lean air fuel mixture to the engine can be prevented.

When a certain time such as 5 seconds lapses since the throttle valve is fully closed, the vacuum degree of the second vacuum chamber 50 becomes equal to that of the first vacuum chamber 48, at which time the diaphragm member 46 moves upward to a preset position by the action of the spring 69.

At this time, if the throttle valve 24 is still at its fully closed position or at nearly fully closed position, for example, during a long period engine deceleration in which the vacuum in the intake conduit 20 downstream of the throttle valves 24 is higher than a predetermined level such as 570 mmHg which is determined by the biasing force of the spring 42, the valve member 38 is moved downward in the drawing overcoming the biasing force of the spring 42 by the action of the pressure differential between the intake passageway 14 upstream of the throttle valves 24 and the intake conduit 20 downstream of the throttle valves 24. It will be understood that the above-mentioned predetermined level of the vacuum prevailing in the intake passageway 14 corresponds to a pressure differential between the upstream and downstream sides of the throttle valve in the intake passageway 14 because the pressure differential in the intake passageway upstream of the throttle valve is approximately equal to atmospheric pressure. Then, the valve member 38 maintains its open state as indicated in FIG. 4. At this moment, the valve member 38 is located at a position which is lower than the initial position of closing state by about 0.8 to 2.0 mm in maximum and accordingly the location of such an open state valve member 38 is lowered with increase in the pressure differential between the upstream and downstream sides of the throttle valves 24. The amount of air supplied through the valve member 38 to the intake conduit 20 increases with increase in the above-mentioned pressure differential, in other words, with increase in the vacuum prevailing in the intake conduit 20 so that the flow amount of the air is, for example, about 200 to 300 liters per minute. As a result, the vacuum downstream of the throttle valves 24 is controlled below the predetermined level. This prevents increased lubricating oil consumption caused by the fact that an extremely high vacuum is maintained for a long period of time at the intake passageway downstream of the throttle valves 24 so that oil is excessively sucked into an engine cylinder (not shown).

In case that the throttle valve 24 is again opened at a time point at which a certain time has lapsed since the throttle valve 24 was rapidly fully closed, i.e., immediatedly after the termination of engine deceleration, the vacuum in the intake conduit 20 downstream of the throttle valves 24 is lower than the predetermined level, so that the valve member 38 is moved upwardly along with the diaphragm member 46 and the rod member 58 by the action of the spring 42 so as to be located at the position to be seated on the valve seat 40, closing the air passage 30.

As apparent from the foregoing, the air induction control device 10 shown in FIGS. 1 to 4 functions to treat two problems which are caused at sudden engine deceleration and long period deceleration, respectively, which two problems have been solved by using two air induction control devices in conventional techniques. As a result, the air induction control device becomes simple in construction as compared with the conventional techniques. This decreases the number of the pipes and brackets used for installation of the air induction device, which renders its production cost low and its weight less, thereby improving fuel economy in engine operation. Additionally, engine layout becomes simple, improving durability, reliability and maintenability of the air induction control device and the engine. This contributes to improvement in commercial value of the engine.

It will be understood that fuel economy during engine deceleration and noxious gas emission control can be further improved it the air induction control device according to the present invention may be used with a device for cutting fuel supply to the engine during engine deceleration.

Figure 5:
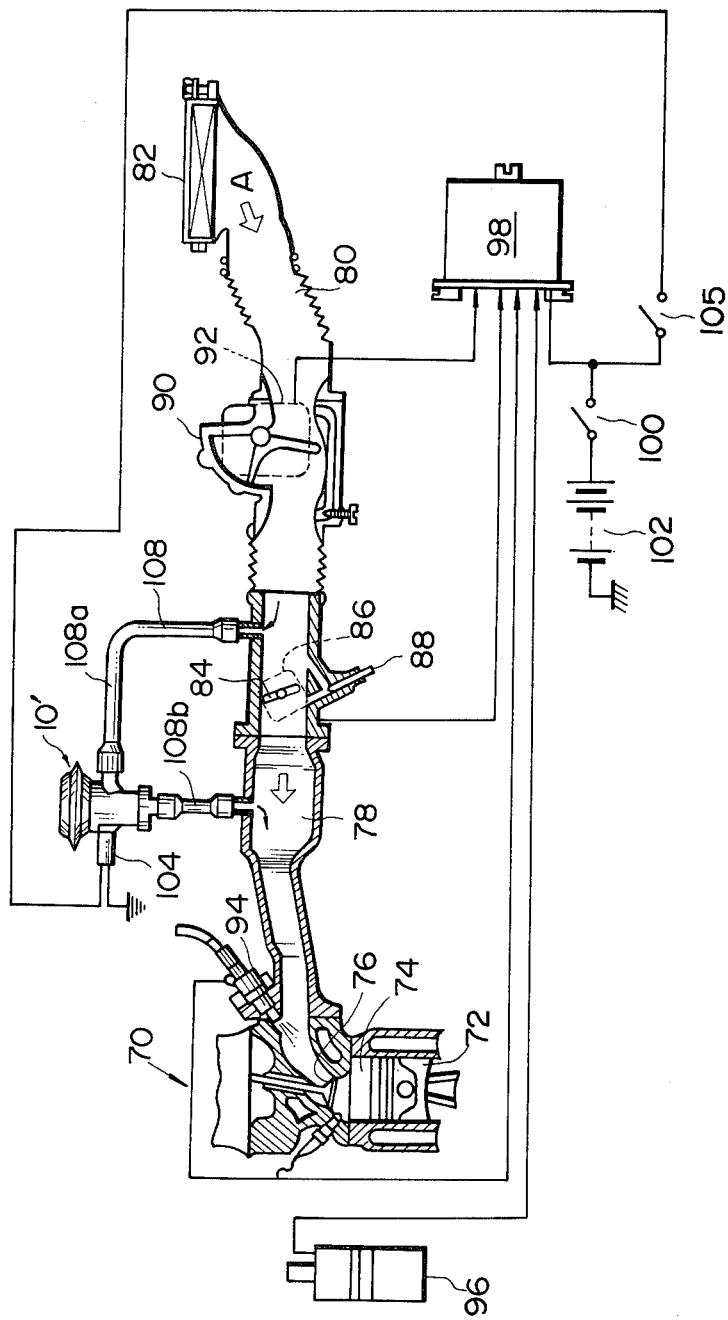
FIG. 5 is a cross-sectional view of an engine provided with another preferred embodiment of the air induction control device in accordance with the present invention.

FIG. 5 shows another preferred embodiment of the air induction control device 10' accorcding to the present invention which is incorporated with an internal combustion engine 70 equipped with a fuel injection system. The engine 70 is as usual provided with cylinders or a cylinder (no numeral) in which a piston 72 is reciprocally disposed to define a combustion chamber 74 by its piston crown in the cylinder. The combustion chamber 74 is communicable through an intake valve 76 with an intake passageway 78 which is formed also through an air induction duct 80 and an air filter 82. A throttle valve 84 is rotatably disposed in the intake passageway 78 to control the amount of air supplied to the combustion chamber 74 of the engine 70. The reference numeral 86 indicates a throttle position switch for sensing the opening degree of the throttle valve 84. An idle adjustment screw 88 is located adjacent to the throttle valve 84. An air flow meter 90 is disposed in the intake passageway 78 upstream of the throttle valve 84. The reference numeral 92 denotes an intake air amount sensor in cooperation with the air flow meter 90. A fuel injector 94 forming part of the fuel injection system is projected into the intake passageway 78 immediately upstream of the intake valve 76 so as to supply metered fuel into the engine 70. An ignition coil 96 is as usual provided and electrically connected to an electronic control unit 98 to which the throttle position switch 86, the air flow amount sensor 92 and the fuel injector 94 are also electrically connected. The electronic control unit 98 is electrically connected through an ignition switch 100 to a battery 102. It is to be noted that the ignition switch 100 is electrically connected to an electromagnetic valve 104 through an accessory operation switch 105 for operating engine accesories such as an air conditioner and a power steering device (not shown). The electromagnetic valve 104 constitutes part of the air induction control device 10' which is disposed in a bypass passage 108 which connect upstream and downstream sides of the throttle valve 84 in the intake passageway 78. The bypass passage 108 is formed, for example, of a rubber hose.

With this arrangement, atmospheric air designated by A is inducted into the combustion chamber 74 of the engine 70 through the air filter 82, the air flow meter 90, the throttle valve 84 and the intake valve 76. When the throttle valve 84 is abruptly fully closed during vehicle cruising, a high vacuum is generated in the intake passageway 78 downstream of the throttle valve 84. Then, when this vacuum exceeds a predetermined level (called valve opening pressure) such as 580 mmHg, the air induction control device 10' opens to cause air upstream of the throttle valve 84 to flow through the bypass passage 108 into the intake passageway 78 downstream of the throttle valve 84. As a result, an excessive high vacuum cannot be generated in the combustion chamber 74 and accordingly stable combustion of air-fuel mixture can be effectively accomplised in the combustion chamber 74. Additionally, lubricating oil is prevented from being sucked inside of the cylinder, improving oil consumption.

In order to prevent engine stall and to increase an electric charge to the battery 102, it is required to increase engine speed during operation of engine accessories such as an air conditioner and a power steering system which increase engine and electric loads. In this regards, when the accessory operation switch 105 is closed during operation at least one engine accessory, the solenoid valve 104 is actuated to compulsorily open the air induction control valve 10'. Then, air is introduced through the bypass passage 108 into the intake passageway 78 downstream of the throttle valve 84, so that the engine speed is increased to meet a required idle engine speed.

FIG. 6 shows in detail the construction of the air induction control device or valve 10' indicated in FIG. 5. The air induction control device 10' is formed thereinside with an air passage or air chamber 106 which communicates the insides of an air inlet 107 and air outlet 108. The air inlet and outlets 107 and 108 are fluidly connected to the upstream and downstream sides 108a and 108b of the bypass passage 108, respectively. The downstream section of the air passage 104 is enlarged in diameter to form a valve chamber or air induction chamber 110. A disc and plate type valve member 112 is movably disposed in the valve chamber 110 and biased to be seated on a valve seat or seal member 114 by means of a spring 116 disposed in the valve chamber 110. A valve guide member 118 is disposed in the valve chamber 110 to restrict the downward movement of the valve member 112 so as to restrict the air flow amount passing through a clearance between the valve member 112 and the valve seat 114.

A diaphragm rod 120 is reciprocally disposed at the central portion of the device 10' and secured at its upper end to the center of a diaphragm member 122. The rod 120 extends into the air passage 106 and supported by a guide sleeve member 124 which serves also as a sealing member. The rod member 120 is provided at its lower end with a damping member 126 through which the rod is contactable on the surface of the valve member 112. It is to be noted that the rod 120 with the damping member 126 can separate from the surface of the valve member 112 when the diaphragm member 122 moves upward in the drawing. The diaphragm member 122 defines a vacuum chamber 128 which is communicable through a vacuum passage 130 with the valve chamber 110. The electromagnetic valve 104 is provided with a plunger 104a whose one end is projected to the vacuum passage 130 and which is normally biased by a spring 104b so as to cause the plunger 104a to close the vacuum passage 130. The electromagnetic valve 104 is so arranged that the plunger 104a is moved in the direction to withdraw the end of the plunger from the vacuum passage 130 overcoming the bias of the spring 14 so that the vacuum passage 130 opens, when the accessory operation switch 105 is closed to energize an electromagnetic coil 104c of the valve 104.

In operation of the air induction control device 10' according to the present invention, during engine deceleration, the opening degree of the throttle valve 84 is decreased so that vacuum acts on the valve member 112. When the vacuum prevailing in the intake passageway downstream of the throttle valve exceeds the predetermined level such as 580 mmHg, the valve member 112 moves downward in the drawing overcoming the biasing force of the spring 116, so that the air inlet 107 becomes in communication with the valve chamber 110 as shown in FIG. 7. It will be understood that the vacuum prevailing in the intake passageway 78 downstream of the throttle valve 84 corresponds to a pressure differential between the upstream and downstream sides of the throttle valve 84 in the intake passageway 78. As a result, a required amount (about 300 liters per minute in maximum) of air is supplied to the engine 70.

During operation of the engine accessories such as the air conditioner and the power steering system at idle throttle position, the accessory operation switch 105 is closed to energize the solenoid 104c of the solenoid valve 104. Then, the plunger 104a is moves leftward in the drawing to open the vacuum passage 130 and accordingly the intake vacuum in the valve chamber 110 is introduced into the vacuum chamber 128. When the vacuum acts on the diaphragm member 122, the diaphragm 122 moves downward in the drawing so as to move the diaphragm rod 120 downward in the drawing. Accordingly, the valve member 112 is compulsorily pushed down as shown in FIG. 8, so that air in an amount of 80 to 100 liters per minute is supplied to the engine 70.

Thus, control of air supply to the engine during engine deceleration and during operation of engine accessories can be achieved by varying the clearance between the valve member 112 and the valve seat 114. In other words, the vacuum generated downstream of the throttle valve 84 is relatively high during engine deceleration and therefore the opening degree of the valve member 112 is relatively large so that a relatively large amount (for example 300 liters per minute in maximum) of air is introduced into the engine 70. On the contrary, the vacuum downstream of the throttle valve 84 is not so high during operation of engine accessories at engine idling as compared with during engine deceleration and therefore the opening degree of the valve member 112 is relatively small so that a relatively small amount (for example about 80 to 100 liters per minute in maximum) is introduced into the engine 70. It will be understood from the foregoing that two air induction requirements can be met by only one valve 10' in accordance with the present invention.

It is to be noted that the diaphragm rod 120 slidably moves in the cylindrical bore of the guide member 124 maintaining a slight clearance therebetween so that atmospheric air can enter the vacuum chamber 128 even when the plunger 140a of the electromagnetic valve 104 closes the vacuum passage 130. Accordingly, it is not caused that vacuum remains in the vacuum chamber 128 so that the valve member 112 is left opened. It will be understood that the solenoid valve 104 may be replaced with a valve which is operated in response to vacuum. While the air induction control device shown in FIG. 6 has been shown and described as incorporated with the engine equipped with the fuel injection system, it will be appreciated that it may be used in an internal combustion engine equipped with a carburetor or carburetors.

As apparent from the foregoing, according to the air induction control device 10' in accordance with the present invention, control during engine deceleration and during engine accessory operation are achieved by only one air induction control device. Accordingly, air induction control during engine deceleration and compensation of the engine idle engine speed can be achieved by only one device or valve. As such, the number of pipes for piping and brackets for installation can be decreased, which can decrease its production cost and its weight, improving fuel economy. Additionally, an engine layout is possible to become high in durability, reliability and maintenability, contributing to the improvement in commercial value of a vehicle.

What is claimed is:

1. An air induction control device for an internal combustion engine having an intake passageway in which a throttle valve is disposed, comprising:
   means defining an air passage for communicating upstream and downstream sides of the throttle valve in said intake passageway when opened;
   a valve member disposed in said air passage and movable toward the downstream side thereof to open said air passage in response to pressure differential between the upstream and downstream sides of the throttle valve in the intake passageway; and
   a diaphragm member mechanically connectable to and separable from said valve member and movable to move said valve member so as to open said air passage in response to vacuum prevailing in the intake passageway downstream of the throttle valve.

2. An air induction control device for an internal combustion engine having an intake passageway in which a throttle valve is disposed, comprising:
   means defining an air passage for communicating upstream and downstream sides of the throttle valve in the intake passageway when opened, said air passage being formed with an enlarged section to define a valve seat;
   a plate type valve member disposed in the enlarged section of said air passage and normally seated on said valve seat to close said air passage, said valve member being movable toward the downstream side of said air passage to separate from said valve seat and thereby open said air passage in response to pressure differential between the upstream and downstream sides of the throttle valve in the intake passageway;
   a spring disposed in the enlarged section of said air passage to bias said valve member to be seated on said valve seat;
   a diaphragm member defining a vacuum chamber communicable with the intake passageway downstream of the throttle valve, said diaphragm member being movable in response to the vacuum prevailing in the intake passageway downstream of the throttle valve; and
   a rod member secured to said diaphragm member and contactable to and separable from said valve member so as to move said valve member to open said air passage in accordance with the movement of said diaphragm member.

3. An air induction control device as claimed in claim 2, in which said spring is so selected that said valve member separates from said valve seat when said pressure differential exceeds a predetermined level.

4. An air induction control system as claimed in claim 2, further comprising another spring disposed in said vacuum chamber to bias said diaphragm member in a direction to increase the volume of said vacuum chamber, said another spring being so selected as to allow said diaphragm member to move in a direction to decrease the volume of said vacuum chamber when the throttle valve is closed.

5. An air induction control device as claimed in claim 2, further comprising a stop member disposed in said enlarged section of said air passage to stop said valve member so that the movement of said valve member from said valve seat is restricted.

6. An air induction control device as claimed in claim 2, in which said diaphragm member further defines another vacuum chamber on the opposite side to said vacuum chamber with respect to said diaphragm member, said diaphragm member being formed with an orifice through which said vacuum chamber is in communication with said another vacuum chamber.

7. An air induction control deivce as claimed in claim 6, in which said vacuum chamber is smaller in volume than said another vacuum chamber.

8. An air induction control device as claimed in claim 2, further comprising means defining a vacuum passage for communicating said vacuum chamber with said valve chamber.

9. An air induction control device as claimed in claim 8, further comprising valve means for normally closing said vacuum passage and opening said vacuum passage in response to the operation of at least one engine accessory.

10. An air induction control device as claimed in claim 9, in which said valve means includes an electromagnetic valve having a plunger for opening said vacuum passage when at least one engine accessory is operated.

11. A device for controlling induction air during deceleration of an internal combustion engine having an intake passageway in which a throttle valve is disposed, comprising:

means defining an air passage for communicating upstream and downstream sides of the throttle valve in the intake passageway when opened, said air passage being formed with an enlarged section to define a valve seat;

a plate type valve member disposed in the enlarged section of said air passage and normally seated on said valve seat to close said air passage, said valve member being movable toward the downstream side of said air passage to separate from said valve seat and thereby open said air passage in response to pressure differential between the upstream and downstream sides of the throttle valve in the intake passageway;

a first spring disposed in the enlarged section of said air passage to bias said valve member to be seated on said valve seat, said first spring being so selected that said valve member separates from said valve seat when said pressure differential exceeds a predetermined level;

a diaphragm member defining first and second vacuum chambers which are located opposite to each other with respect to said diaphragm member, said first vacuum chamber being in communication with the intake passageway downstream of the throttle valve, said diaphragm member being formed with an orifice through which said first vacuum chamber is in communication with said second vacuum chamber, said diaphragm member being movable in response to vacuum prevailing in the intake passageway downstream of the throttle valve;

a second spring disposed in said first vacuum chamber to bias said diaphragm member in a direction to increase the volume of said first vacuum chamber, said second spring being so selected as to allow said diaphragm member to move in a direction to decrease the volume of said first vacuum chamber when the throttle valve is closed; and a rod member secured to said diaphragm member and contactable to and separable from said valve member so as to move said valve member to open said air passage in accordance with the movement of said diaphragm member.

12. An air induction control device for an internal combustion engine having an intake passageway in which a throttle valve is disposed, comprising:

means defining an air passage for communicating upstream and downstream sides of the throttle valve in the intake passageway when opened, said air passage being formed with an enlarged section to define a valve seat;

a plate type valve member disposed in the enlarged section of said air passage and normally seated on said valve seat to close said air passage, said valve member being movable toward the downstream side of said air passage to separate from said valve seat and thereby open said air passage in response to pressure differential between the upstream and downstream sides of the throttle valve in the intake passageway;

a spring disposed in the enlarged section of said air passage to bias said valve member to be seated on said valve seat, said spring being so selected that said valve member separates from said valve seat when said pressure differential exceeds a predetermined level;

a diaphragm member defining a vacuum chamber and movable in response to vacuum prevailing in the intake passageway downstream of the throttle valve;

a rod member secured to said diaphragm member and contactable to and separable from said valve member so as to move said valve member to open said air passage in accordance with the movement of said diaphragm member;

means defining a vacuum passage through which said vacuum chamber and said air passage downstream of said valve member is communicable to supply the vacuum chamber with the vacuum prevailing in the intake passageway downstream of the throttle valve when said vacuum passage is opened; and normally closed valve means and opening means therefor for opening said vacuum passage when at least one engine accessory is operated.

13. An air induction control device for an internal combustion engine having an intake passageway in which throttle valve is disposed, said device comprising:

means defining an air passage bypassing said throttle valve and communicating the upstream and downstream sides of said throttle valve in the intake passageway;

a valve member disposed in said air passage and movable toward the downstream side thereof to open said air passage in response to a pressure differential between the upstream and downstream sides of said valve member in said air passage; and a diaphragm member operable, in an operative connection with said valve member, to open said air passage in response to the vacuum prevailing in said intake passageway downstream of the throttle valve, the operative connection between said diaphragm member and said valve member being releasable so that said valve member is operative independently of said diaphragm member.

14. An air induction control device as claimed in claim 6, in which said another vacuum chamber is tightly closed except for said orifice.

* * * * *